US012394892B2

(12) United States Patent
Lv et al.

(10) Patent No.: US 12,394,892 B2
(45) Date of Patent: Aug. 19, 2025

(54) HORIZONTAL-PLANE NULL FREQUENCY SCANNING ANTENNA

(71) Applicant: Nanjing University Of Posts And Telecommunications, Jiangsu (CN)

(72) Inventors: Wenjun Lv, Jiangsu (CN); Xiaohui Mao, Jiangsu (CN); Feiyan Ji, Jiangsu (CN); Heng Zhang, Jiangsu (CN); Shanshan Gu, Jiangsu (CN); Xiaohui Li, Jiangsu (CN)

(73) Assignee: Nanjing University Of Posts And Telecommunications, Jiangsu (CN)

( * ) Notice: Subject to any disclaimer, the term of this patent is extended or adjusted under 35 U.S.C. 154(b) by 0 days.

(21) Appl. No.: 18/867,451

(22) PCT Filed: Nov. 13, 2023

(86) PCT No.: PCT/CN2023/131244

§ 371 (c)(1),
(2) Date: Nov. 20, 2024

(87) PCT Pub. No.: WO2024/174593

PCT Pub. Date: Aug. 29, 2024

(65) Prior Publication Data

US 2025/0174888 A1 May 29, 2025

(51) Int. Cl.
*H01Q 3/26* (2006.01)
*H01Q 1/38* (2006.01)
*H01Q 1/50* (2006.01)

(52) U.S. Cl.
CPC ............ *H01Q 3/2611* (2013.01); *H01Q 1/38* (2013.01); *H01Q 1/50* (2013.01)

(58) Field of Classification Search
CPC ........... H01Q 3/2611; H01Q 1/38; H01Q 1/50
See application file for complete search history.

(56) References Cited

U.S. PATENT DOCUMENTS 11,349,216 B2 * 5/2022 Lv ............................ H01Q 5/15
11,387,551 B2 * 7/2022 Lv ........................ H01Q 9/0442
2021/0376474 A1 12/2021 Lv et al.

FOREIGN PATENT DOCUMENTS

CN 110289494 9/2019
CN 113745813 12/2021
(Continued)

OTHER PUBLICATIONS

Zhi-Fang Wu et al., "Wideband Null Frequency Scanning Circular Sector Patch Antenna Under Triple Resonance", IEEE Transactions on Antennas and Propagation, Nov. 2020, pp. 7266-7274, vol. 68, No. 11.

(Continued)

*Primary Examiner* — David E Lotter
(74) *Attorney, Agent, or Firm* — JC ONE WORLD

(57) ABSTRACT

A first sector patch and a second sector patch are loaded on a dielectric substrate having any dielectric constant. The circumferences of the first sector patch and the second sector patch are connected to the dielectric substrate by means of vertical shorting walls, respectively. Notches, a coaxial feeding probe, and a shorting pin are loaded on the first sector patch, so that the first three radiation patterns of the antenna are excited, disturbed and aggregated, and radiation null points which can be scanned along with a frequency change are symmetrically generated on a horizontal plane; moreover, addition of the second sector patch realizes a single-direction null frequency scanning function on the horizontal plane.

9 Claims, 3 Drawing Sheets

(56) References Cited

FOREIGN PATENT DOCUMENTS

| | | |
|---|---|---|
| CN | 115995684 | 4/2023 |
| KR | 101746338 | 6/2017 |
| WO | 2019062654 | 4/2019 |

OTHER PUBLICATIONS

"International Search Report (Form PCT/ISA/210) of PCT/CN2023/131244", mailed on Feb. 27, 2024, with English translation thereof, pp. 1-6.

"Written Opinion of the International Searching Authority (Form PCT/ISA/237) of PCT/CN2023/131244", mailed on Feb. 27, 2024, pp. 1-4.

* cited by examiner

HORIZONTAL-PLANE NULL FREQUENCY SCANNING ANTENNA

CROSS-REFERENCE TO RELATED APPLICATION

This application is a 371 of international application of PCT application serial no. PCT/CN2023/131244, filed on Nov. 13, 2023, which claims the priority benefit of China application no. 202310161544.5, filed on Feb. 23, 2023. The entirety of each of the above mentioned patent applications is hereby incorporated by reference herein and made a part of this specification.

TECHNICAL FIELD

The present disclosure relates to a horizontal-plane null frequency scanning antenna, which belongs to the fields of the antenna and the microwave technology and the Internet of Things.

BACKGROUND

With the continuous development of the wireless communication technology, the frequency range of the interference signals has expanded and the electromagnetic environment has been deteriorating. In order to improve the reliability and the effectiveness of the communication systems, the interference signals are required to be located and eliminated. The traditional direction-finding antennas and the anti-interference antennas are large in size and complex in structure. With the advent of the 6G era, on one hand, the communication spectrum will further be evolved to the high frequency, and on the other hand, the communication spectrum will be distributed and occupied the lower frequency. As the frequency bands occupied by the system increase and the density of equipment increases, in order to eliminate the interference between the systems, it is necessary to develop various types of the miniaturized direction-finding and anti-interference antennas.

The microstrip patch antenna is one of the most widely used antenna in the wireless communication systems. However, the ordinary microstrip patch antenna does not has the radiation null frequency scanning function, and the specially designed microstrip patch antenna can merely implement the null frequency scanning function in the elevation plane, but cannot implement the null frequency scanning function in the horizontal plane.

SUMMARY

In order to solve the above problems, a novel design method for a horizontal-plane null frequency scanning antenna is provided in the present disclosure. The designed antenna can generate a radiation null point that can be scanned with the frequency variation in the horizontal plane. The scanning direction of the radiation null point is unidirectional, and the slope of the null frequency scanning curve can be positive or negative. The antenna is small in size, simple in structure, and low in profile, and is easy to manufacture and implement. The null frequency scanning in a wide angle range is implemented in the horizontal plane without adding additional complex phase-shifting power division network, and the antenna has a broad application prospect in the direction-finding system and the anti-interference system in the wireless communication.

In order to solve the above technical problems, the following technical solutions are adopted in the present disclosure.

Provided is a horizontal-plane null frequency scanning antenna, the antenna comprises a dielectric substrate, a first sector patch a second sector patch.

The first sector patch and the second sector patch are in connection with the dielectric substrate through vertical shorting walls at respective circumferences of the first sector patch and the second sector patch to form a non-enclosed structure.

A pin in connection with the dielectric substrate is arranged on the first sector patch.

The first sector patch is provide with notches symmetrically extending inwards from two radial edges of the first sector patch, and lengths of the notches are greater than or equal to 0.25 wavelengths.

A coaxial feeding structure in connection with the dielectric substrate is arranged on the first sector patch, and a coaxial feeding method is utilized to fed.

Further, a central angle of the first sector patch is greater than 10° and less than or equal to 150°, and a central angle of the second sector patch is greater than 30° and less than or equal to 180°.

Further, a radius of the first sector patch is greater than or equal to 0.8 wavelengths, a radius of the second sector patch is greater than or equal to 0.3 wavelengths, and the radius of the first sector patch is 0.25 to 0.75 wavelengths longer than the radius of the second sector patch.

Further, an included angle between a central axis of the first sector patch and a central axis of the second sector patch is greater than 30° and less than or equal to 180°.

Further, a distance between a center of a circle of the first sector patch and a center of a circle of the second sector patch is greater than or equal to 0.01 wavelength.

Further, a height difference between the first sector patch and the second sector patch is greater than or equal to 0 wavelength.

Further, the shorting pin is located on the central axis of the first sector patch and is 0.5 wavelengths away from the center of the circle of the first sector patch.

Further, the coaxial feeding structure is located on the central axis of the first sector patch.

In comparison with the prior art, the technical solutions adopted in the present disclosure have the following technical effects. The present disclosure can generate a radiation null point that can be scanned with the frequency variation in the horizontal plane by loading the circumferential-short-circuited first sector patch and the second sector patch, and providing the first sector patch with the shorting pin and the notches, while utilizing the planar structure. The scanning direction of the radiation null point is unidirectional, and the slope of the null frequency scanning curve can be positive or negative. The antenna has a wide scanning range, a high sensitive, a small size, a low profile and a simple structure, and no additional complex phase-shifting power division network is required to be added, which is easy to manufacture and implement. The antenna has a broad application prospect in the direction finding system and the anti-interference system in the wireless communication.

Among them, 1, 1', 1" are respectively dielectric substrate, first sector patch, second sector patch, 2, 2' are notches, 3 is coaxial feeding structure, 4 is shorting pin, 5 is central axis of the first sector patch, 6 is central axis of the second sector patch.

DETAILED DESCRIPTION OF THE EMBODIMENTS

The embodiments of the present disclosure are described in detail below, and the exemplifications in the embodiments are illustrated in the accompanying drawings. The embodiments described below with reference to the accompanying drawings are exemplary and are merely utilized to explain the present disclosure, rather than be interpreted as defining the present disclosure.

It will be understood by those skilled in the art that, unless otherwise defined, all terms (including technical and scientific terms) used herein have the same meaning as generally understood by those ordinary skilled in the art which the present disclosure belongs to. It should also be understood that the terms such as those defined in common dictionaries should be understood to have the meanings consistent with the meanings in the context of the prior art, and will not be interpreted with idealized or overly formal meanings unless defined as herein.

The technical solutions of the present disclosure are further described in detail below with reference to the accompanying drawings.

Figure 1:
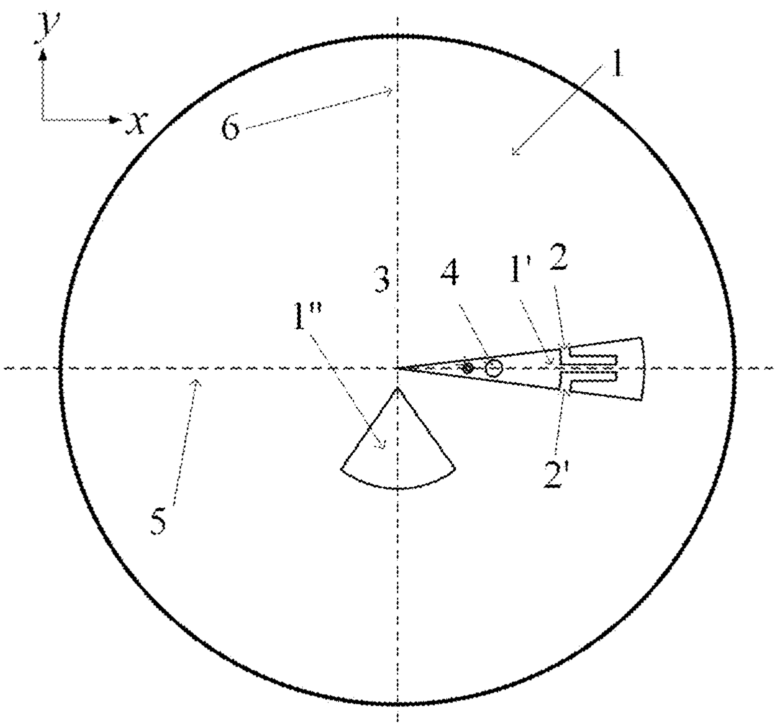
FIG. 1 illustrates a schematic diagram of a front structure of an antenna and reference coordinates in one embodiment of the present disclosure.
Figure 2:
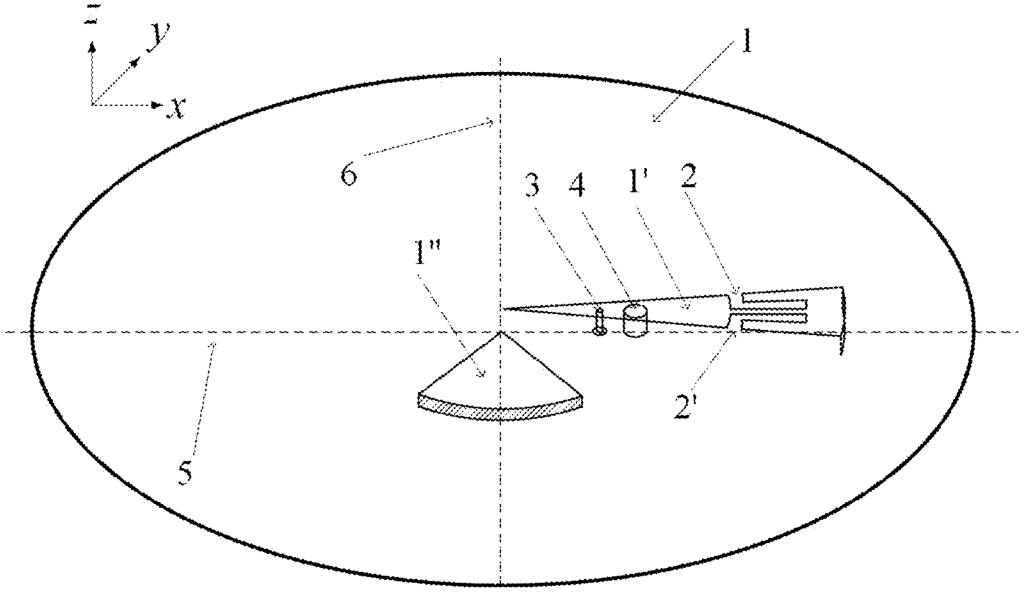
FIG. 2 illustrates a three-dimensional schematic diagram of an antenna and a schematic diagram of reference coordinates in one embodiment of the present disclosure.

As illustrated in FIGS. 1 and 2, in one embodiment, the horizontal-plane null frequency scanning antenna is formed by a first sector patch with a symmetrical notch structure, a second sector patch and a circular dielectric substrate. The first sector patch and the second sector patch are respectively in connection with the circular dielectric substrate through the vertical shorting walls at the respective circumferences of the first sector patch and the second sector patch to form a non-enclosed structure. In this embodiment, the first sector patch is parallel to the second sector patch and a height difference exists between the first sector patch and the second sector patch. A coaxial feeding probe and a shorting pin in connection with the circular dielectric substrate are arranged on the central axis of the first sector patch, and the relative dielectric constant of the circular dielectric substrate is in a range from 1 to 20.

An air medium is utilized in this embodiment, a radius of the circular dielectric substrate is 100 mm, a radius of the first sector patch with a notch structure is 72.8 mm, and a radius of the second sector patch is 30 mm. A degree of a central angle of the first sector patch is 15°, and a degree of a central angle of the second sector patch is 70°. A distance between the first sector patch and the dielectric substrate is 5 mm, a distance between the second sector patch and the dielectric substrate is 3 mm, and a height difference between the first sector patch and the second sector patch is 2 mm. An included angle between the central axis of the first sector patch and the central axis of the second sector patch is 90°. A distance between a center of a circle of the first sector patch and a center of a circle of the second patch is 5 mm. An initial point of the notch on the first sector patch is 48.2 mm away from the center of the circle of the first sector patch, a length of the notch on the first sector patch is 16.5 mm, and a width of the notch on the first sector patch is 3 mm. The coaxial feeding structure and the shorting pin are both arranged on the central axis of the first sector patch, and the coaxial feeding structure is 20.6 mm away from the center of the circle of the first sector patch, and the shorting pin is 21.2 mm away from the center of the circle of the first sector patch. The radius of the coaxial feeding structure is 0.65 mm, and the radius of the shorting pin is 2.5 mm.

All the characteristics of the antenna are calculated and obtained by the HFSS software.

Figure 3:
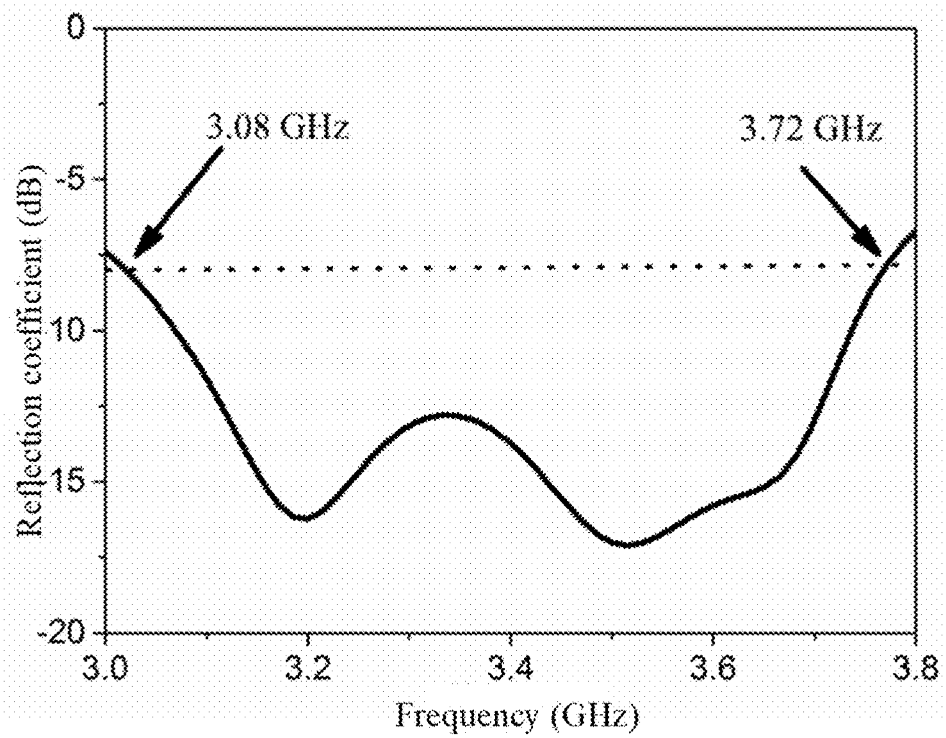
FIG. 3 illustrates a diagram of a reflection coefficient characteristic of the antenna calculated by utilizing the high frequency structure simulator (HFSS) software in one embodiment of the present disclosure.

The reflection coefficient characteristic of the antenna in this embodiment calculated by utilizing the HFSS software is illustrated in FIG. 3. The tri-mode resonance is implemented by the antenna, and the impedance bandwidth of the antenna covers the frequency band from 3.08 GHz to 3.72 GHz, and the relative bandwidth of the antenna is 19.5%.

Figure 4:
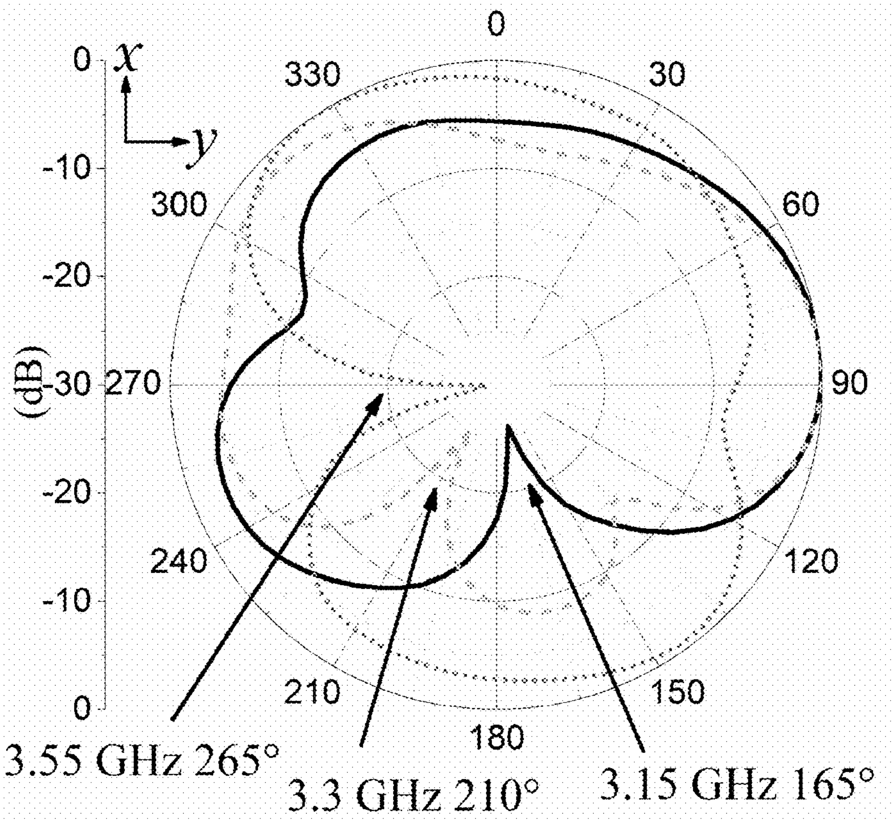
FIG. 4 illustrates an antenna radiation pattern calculated by the HFSS software in one embodiment of the present disclosure.

A radiation pattern calculated by the HFSS software in the embodiment is illustrated in FIG. 4, the solid line denotes the pattern at a frequency of 3.15 GHz, and the null point is generated at an azimuth angle of 165°. The dashed line denotes the pattern at a frequency of 3.3 GHz, and the null point is generated at an azimuth angle of 210°. The dotted line denotes the pattern at a frequency of 3.55 GHz, and the null point is generated at an azimuth angle of 265°. It can be seen that, the unidirectional horizontal-plane null frequency scanning is implemented by the antenna.

Figure 5:
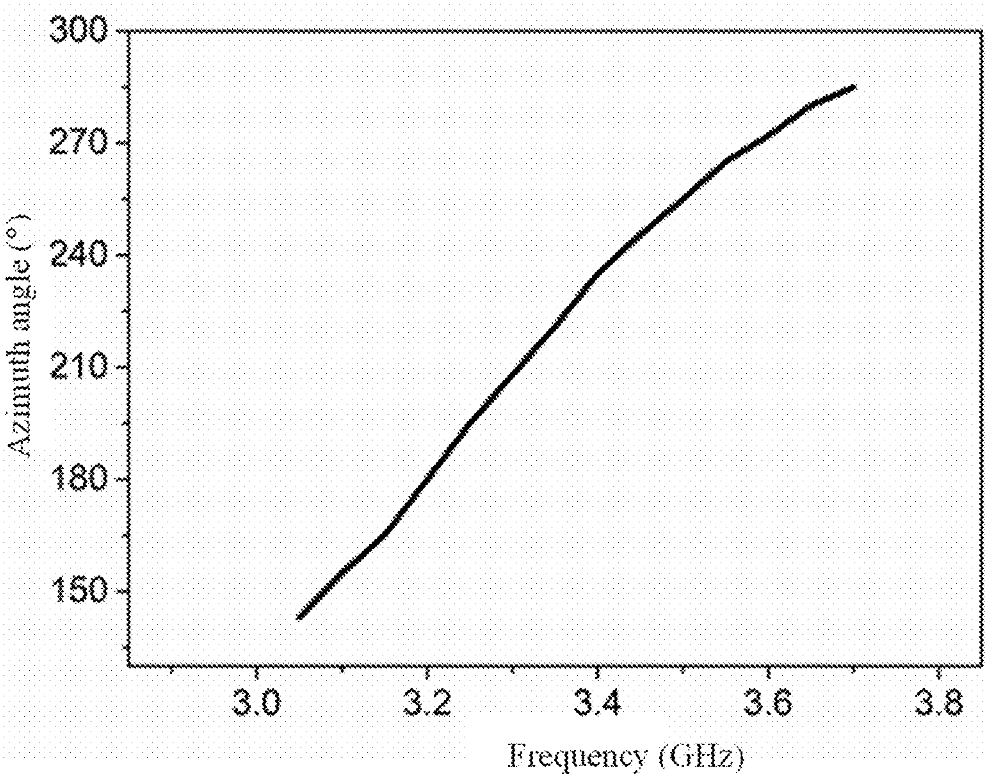
FIG. 5 illustrates an angular frequency curve of the radiation null frequency scanning of the antenna in one embodiment of the present disclosure.

An angular frequency curve of the radiation null frequency scanning of the antenna in this embodiment is illustrated in FIG. 5. The null frequency scanning is implemented by the antenna in the azimuth angle range from 145° to 285°, and the angular frequency curve exhibits a positive slope characteristic.

In summary, the horizontal-plane null frequency scanning antenna provided in the present disclosure can implement the bidirectional horizontal-plane null frequency scanning performance through the circumferential-short-circuited first sector patch in a symmetrical notch structure that is loaded with a shorting pin and a dielectric substrate. Meanwhile, the horizontal-plane unidirectional null frequency scanning performance is implement by adding a non-enclosed structure of a second sector patch with a circumferential short circuit. The horizontal-plane null frequency scanning antenna designed by the present disclosure has a wide scanning range, a high sensitivity, a small size, a low profile and a simple structure, and has a broad applicant prospect in the direction-finding system and the anti-interference system in the wireless communication.

The above descriptions are merely specific implementations of the present disclosure, but the protection scope of the present disclosure is not limited thereto. The transformations and the substitutions that can be understood and imaged by a person who is familiar with the technology within the technical scope disclosed by the present disclosure should be included in the scope of the present disclosure. Therefore, the protection scope of the present disclosure should be based on the protection scope of the claims.

What is claimed is:

1. A horizontal-plane null frequency scanning antenna, comprising: a dielectric substrate, a first sector patch, and a second sector patch parallel to the first sector patch, wherein the first sector patch and the second sector patch are in connection with the dielectric substrate through vertical shorting walls at respective circumferences of the first sector patch and the second sector patch to form a non-enclosed structure;

the first sector patch is provide with notches symmetrically extending inwards from two radial edges of the first sector patch;

a coaxial feeding structure in connection with the dielectric substrate is arranged on the first sector patch; and a shorting pin in connection with the dielectric substrate is arranged on the first sector patch.

2. The horizontal-plane null frequency scanning antenna according to claim 1, wherein a radius of the first sector patch is greater than or equal to 0.8 wavelengths, a radius of the second sector patch is greater than or equal to 0.3 wavelengths, the radius of the first sector patch is 0.25 to 0.75 wavelengths longer than the radius of the second sector patch.

3. The horizontal-plane null frequency scanning antenna according to claim 1, wherein a central angle of the first sector patch is greater than 10° and less than or equal to 150°, and a central angle of the second sector patch is greater than 30° and less than or equal to 180°.

4. The horizontal-plane null frequency scanning antenna according to claim 1, wherein an included angle between a central axis of the first sector patch and a central axis of the second sector patch is greater than 30° and less than or equal to 180°.

5. The horizontal-plane null frequency scanning antenna according to claim 1, wherein a distance between a center of a circle of the first sector patch and a center of a circle of the second sector patch is greater than or equal to 0.01 wavelength.

6. The horizontal-plane null frequency scanning antenna according to claim 1, wherein a height difference between the first sector patch and the second sector patch is greater than or equal to 0 wavelength.

7. The horizontal-plane null frequency scanning antenna according to claim 1, wherein lengths of the notches are greater than or equal to 0.25 wavelengths.

8. The horizontal-plane null frequency scanning antenna according to claim 1, wherein the shorting pin is located on a central axis of the first sector patch and is 0.5 wavelengths away from a center of a circle of the first sector patch.

9. The horizontal-plane null frequency scanning antenna according to claim 1, wherein the coaxial feeding structure is located on a central axis of the first sector patch.

* * * * *